(12) United States Patent
McKibben et al.

(10) Patent No.: US 7,703,269 B2
(45) Date of Patent: Apr. 27, 2010

(54) HARVESTING MACHINE IMPROVEMENT

(75) Inventors: Jeffrey David McKibben, Grand Junction, MI (US); Richard Eugene Mayer, Jr., Grand Junction, MI (US); Skye Joseph Thrasher, Grand Junction, MI (US)

(73) Assignee: McKibben Mfg., Inc., Grand Junction, MI (US)

( * ) Notice: Subject to any disclaimer, the term of this patent is extended or adjusted under 35 U.S.C. 154(b) by 0 days.

(21) Appl. No.: 12/217,794

(22) Filed: Jul. 9, 2008

(65) Prior Publication Data

US 2010/0005772 A1    Jan. 14, 2010

(51) Int. Cl.
*A01D 46/22* (2006.01)
(52) U.S. Cl. .......................................... 56/329; 56/330

(58) Field of Classification Search ................ 56/328.1, 56/329, 330
See application file for complete search history.

(56) References Cited

U.S. PATENT DOCUMENTS

| | | | |
|---|---|---|---|
| 3,385,042 A * | 5/1968 | Christie et al. | 56/330 |
| 3,449,895 A * | 6/1969 | Pertics | 56/330 |
| 4,150,526 A | 4/1979 | Burton | |
| 4,464,888 A | 8/1984 | Burton | |
| 5,341,630 A * | 8/1994 | Littau | 56/330 |
| 5,956,933 A * | 9/1999 | Heard | 56/329 |

* cited by examiner

*Primary Examiner*—Alicia M Torres
(74) *Attorney, Agent, or Firm*—Joseph K. Andonian

(57) ABSTRACT

A scale or leaf for a berry picking machine and a collector scale assembly including the scale. A freely rotating circular disc on the free end of the scale when attached to a rail of the machine is the most distinctive feature of the comma shaped scale.

5 Claims, 3 Drawing Sheets

HARVESTING MACHINE IMPROVEMENT

This invention relates to an improvement for berry harvesting machines, more particularly an improved collection leaf or scale used in the machines to reduce waste and damage during the picking operation.

BACKGROUND OF THE INVENTION

Blueberry bushes are arranged in long parallel rows. Blueberry harvesting machines are several feet long and look like an inverted U when observed from the front to back. The machines straddle the bushes as they move along the rows to pick the berries. Various means are used to loosen the berries from the bushes and dropping them onto leaves or scales that fill the space inside the bottom of the inverted U to collect the berries. The leaves are arranged in two parallel rows with a pivot on one end of each leaf connected to a bearing in a rail. The rails are attached to the inside surface or frame of the machine and run parallel to the rows of bushes when the machine runs over the bushes. The pivots are arranged on the rails so the leaves are tilted upward from front to back so they partially overlap one another like the scales on a fish. The free ends of the leaves in each row are also tilted slightly upward toward the center of the machine and slightly overlap the free ends of their mirror image counterparts on the opposite side of the machine. A row of leaves on one side of the machine is positioned directly opposite its mirror image counterpart in on the other side of the machine. They are called "leaves" apparently because they are roughly shaped like leaves or "scales" apparently because they overlap one another like the scales on a fish. For convenience, the word "scales" will be used hereinafter except when referring to prior art that uses the word "leaves".

As the machine moves over the bushes the scales contact the bushes and rotate on their pivots while maintaining contact with the bushes. A spring connects each scale to the rail and by resisting movement of the scale helps to maintain the contact and return the scale to its resting position. Blueberry bushes do not have a single trunk or stem. Instead they branch out from the bottom into several stalks arranged in a roughly circular pattern. Since the scales are tipped upwards toward the center of the machine, the berries will roll from the center of the machine toward conveyers arranged along the sides of the machine. The conveyers then transport the berries into containers that are used to collect and store the berries. A description of typical blueberry picking machines can be found in U.S. Pat. Nos. 4,134,251, 5,113,644 and 5,259,177.

An important problem with the machines is their inability to harvest all of the berries that fall from the bushes. Since the scales can't cover all of the space under the bushes, a significant portion of the berries will fall onto the ground and are wasted. This results in a very substantial loss to berry farmers. It is highly desirable therefore to design the scales in such a way that they catch as many berries as possible. It is also highly desirable to avoid damage to the bark of the stalks when contacted by the scales. The bushes become more susceptible to disease when the bark is damaged.

U.S. Pat. No. 4,150,526 attempts to address the problem of waste by providing a collector leaf construction that includes a primary and a secondary leaf portion and claims that the separate movement of each portion covers more of the space under a blueberry bush thus reducing the waste from 35-50 percent to 15 percent (column 4, lines 53-59). U.S. Pat. No. 4,464,888 also addresses the problem of waste by employing a collector leaf having a particular shape, primarily a concave leading edge and a convex trailing edge. FIGS. 4 and 5 of that patent illustrate how that shape covers more of the space around a plant trunk or trellis post such as support grape bushes thereby producing a saving of 12 to 15 percent (column 4, lines 64-65). The rationale could not be equally applicable to blueberry bushes that do not have a single trunk or a supporting post. Instead they branch into several irregularly placed stalks.

The present invention not only addresses the objective of reducing waste but also reduces damage to the blueberry bushes. Because raspberries grow on several stalks per plant like blueberry bushes, the present invention is also useful for harvesting raspberries.

BRIEF SUMMARY OF INVENTION

Disclosure of Invention

The principal objective of the present invention is to provide improved collecting scales for berry harvesting machines that reduce both waste and damage to the bushes resulting from use of mechanical picking operations.

Another objective is to provide improved rails with attached scales for use as replacement parts in existing blueberry picking machines.

Other objectives will become apparent in the description that follows.

In its broadest embodiment the present invention provides a collecting scale for a berry harvesting machine that has the appearance of a giant comma having a rounded top and a pointed bottom with a freely revolvable round disc at the top and a pivot at the bottom. The comma shape is made possible by the addition of a plate between the disc and the pivot with a leading and trailing edges that taper from the disc toward the pivot. More particularly the comma shaped scale has a lower body with a leading edge that has a flat dish shaped appearance below the disc and a trailing edge that is an approximate continuation of the curvature present in a comma albeit with a straight segment near the disc that curves into another straight segment toward the pivot.

This overall appearance is achieved by an assembly that comprises an arm having a first end, a second end, a top surface and a bottom surface; pivot means connected to the bottom of the first end of the arm; a freely rotatable circular disc mounted to the top of the second end of the arm; a plate fastened to the top of the first end of the arm between the disc and the pivot means; said plate having a leading edge that is shaped like a midline cross section of the open top of a dish with a flat middle segment; a more convex trailing edge having a straight segment near the disc that curves into another straight segment toward the pivot means; and a flat top for the assembled arm, disc and plate. The straight section of the trailing edge is parallel to a rail when the scale is mounted in a bearing on the rail. The rail is bolted near the bottom of the inside wall or frame of the machine. This position is hereinafter referred to as a "closed" position and is maintained by a stop on the bottom of the arm near the pivot that butts up against another stop on the rail. Likewise the straight segment of the leading edge would be parallel to the rail after the scale is deflected when it contacts and maintains the contact as it moves around one or more stalks of a berry bush. This will hereinafter be referred to as an "open" position.

The comma shape and the rotating disc are the most distinctive features of this invention. The comma shape covers more of the area around the stalks and provides shorter and faster rotation from closed to open and open to closed position and thereby reduces waste substantially. This movement is closer to being perpendicular to the movement of the machine over the rows of bushes than the movement of prior art scales and accounts for the shorter time it takes the present scales to open and close around the bushes and consequently reduces the open space required for the berries to fall on the ground as the machine moves over the bushes. By rotating freely around each stalk the round disc also helps to reduce the open space more than the straighter rigid edges of prior art scales. The freely rotating disc also provides less resistance as it rotates instead of drags over and rubs up against the stalks and thereby substantially reduces the damage to the bark covering the stalks. The only time a stalk contacts the rigid part of the present scale it when the scale reaches the stalk in a large bush and then only for a short period of time. Thereafter the contact is limited to the rotating disc. For smaller bushes the only contact is with the disc.

The invention also provides a matching pair of rails as replacement parts for the rails in existing machines, each rail having multiple scales (preferably 27) spaced on pivots in a partially overlapping arrangement from front to back and tipped upwards from end to end. When mounted in a machine, the free ends of the scales attached to each rail will partially overlap their mirror image counterparts and cover the lower part of the open center of the machine. The fact that the scales of the present invention are more numerous and closer together than prior art scales on each rail (e.g., 27 as opposed to 22 and 4.5 inches apart as opposed to 6 inches) means they follow one another faster and more completely cover the open space around each stalk and bush and therefore reduce waste more than prior art scales. Each scale rotates around a stalk and, because it both moves quickly from closed to open and from open back to closed and is closer to a neighboring scale, it is quickly replaced by another scale that also rotates around the stalk and so on. The short time it takes for each scale to move over each stalk is associated with the almost perpendicular movement of the scale in relation to the movement of the machine. The shape of the scale makes this possible.

Although the invention is described for use in blueberry and raspberry harvesting machines, its advantages are also apparent when used for picking other fruits especially but not exclusively where bushes with multiple stalks are present.

LIST OF REFERENCE NUMERALS

Figure 1:
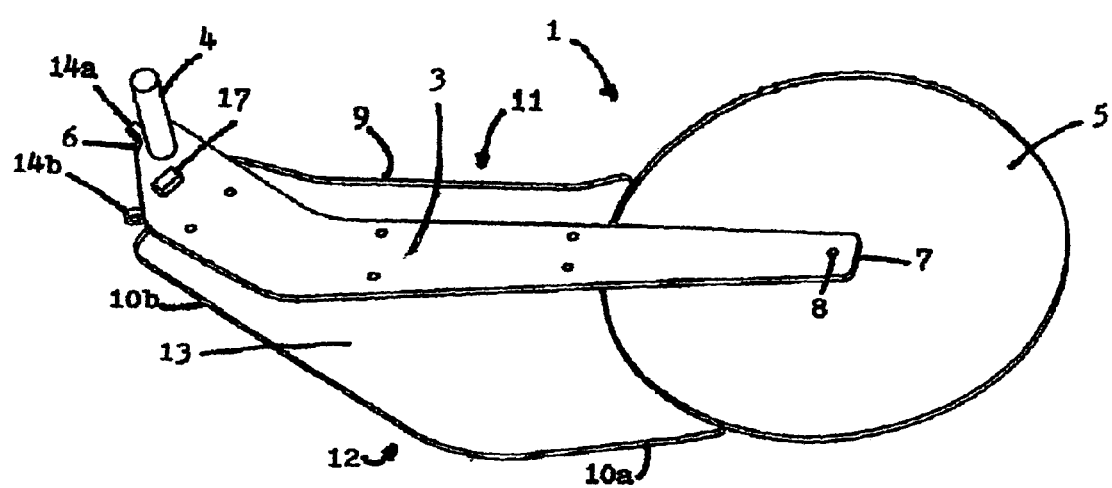
FIG. 1 is a perspective view from the bottom of a collecting scale.
Figure 2:
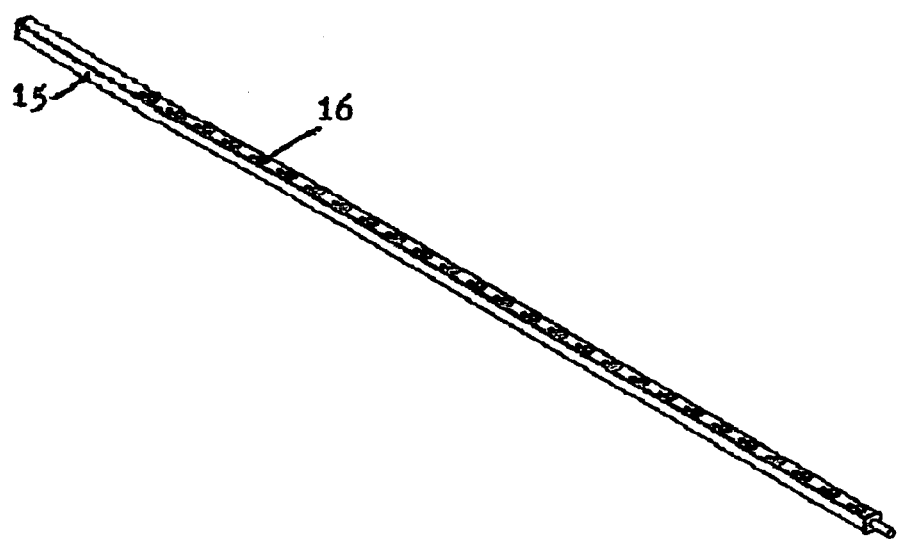
FIG. 2 a perspective view of a rail.

1 A scale
3 Arm
4 Pivot
5 Disc
6 First or pivot end of arm
7 Second or disc end of arm
8 Disc bolt
9 Straight segment of leading edge of scale
10a, 10b Straight segments of trailing edge of scale
11 Leading edge of scale
12 Trailing edge of scale
13 Top plate
14a,14b Eyelets
15 Rail
16 Typical bearing in rail
17 Stop
18 Typical stalk

DETAILED DISCLOSURE OF INVENTION

Best Mode of Carrying out the Invention

FIG. 1 provides a perspective view from the bottom of a preferred embodiment of a scale 1 that consists of four main parts fastened together, an arm 3, a pivot 4, a disc 5, and a plate 13 for attachment to the top of arm 3. FIG. 1 also provides a view of the stop 17.

The arm 3 is preferably made of hot rolled 7-gage steel and is shaped approximately like a hockey stick albeit the portion corresponding in appearance to the shaft is wider (3 inches) at the pivot end than at the disc end (1.5 inches) as shown. The leading edge of the portion of the arm 3 corresponding to the shaft of a hockey stick is 14⅝ inches long and the remainder beyond the bend corresponding in appearance to the blade of a hockey stick is 6 inches long for a total of 20⅝ inches.

The pivot 4 is made of ¾ inch cold rolled shafting and is preferably 3.5 inches long and welded from the top through a hole in the arm under the end of the arm 3.

The disc 5 is preferably 13 inches in diameter and attached to the disc end 7 (by analogy the free end of the shaft of the hockey stick) of the arm 3 using a bolt 8 with bushings that permit the disc 5 to rotate freely. The diameter of the disc can vary from about 11 to about 15 inches. The plate 13 and the disc 5 are preferably made of the same thickness (¼ inch) of the same clear hard durable polycarbonate plastic like Lexan (registered trademark). The material used is not critical as long as it is hard and durable.

The plate 13 is affixed to the top surface of the arm 3 using six rivets as shown. The top surface of the top plate 13 lies on the same plane as the top surface of the disc 5. The top of the plate 13 is curved to match the curvature of the disc 5. The leading and trailing edges 11,12 of the plate 13 are generally concave and convex in shape and taper from the disc 5 toward the pivot 4. The widest dimension of the plate 13 near the disc 5 is about 9 inches and its narrowest dimension near the pivot 4 is about 4 inches. The leading edge 11 of the plate 13 is shaped like the midline cross section of a flat-bottomed dish. The flat bottom is about 7 inches long. The trailing edge 12 has straight segments 10a,10b that are about 7 and about 9 inches long respectively and extend from the disc 5 to the pivot 4.

In overall dimensions the scale 1 is about 27 inches long and 13 inches wide at the disc 5 end and less than one inch wide at the pivot 4 end.

Two eyelets 14a,14b are welded to the pivot end of the arm 3 to serve as places where springs (not shown) can be attached. Springs are used to facilitate the return of scales to a resting or closed position after they have been rotated by contact with the bushes. Two eyelets are employed for the scales of the preferred embodiment of the present invention to allow the user to attach a spring from a scale to either the rail or to a neighboring scale. The latter arrangement is preferred because continuous tension on the spring can be employed between scales, would never be zero and therefore would make for a faster return of the scale to a resting or closed position. This arrangement is not however a critical feature of the present invention.

The stop 17 is made of the same material as the arm 3 and is welded to the underside of the arm 3 about ½ inch from the surface of the pivot 4. As shown it is a ¾ inch segment of a ⅜ inch square bar, but these dimensions are not critical. It only needs to butt up against a comparable stop on the rail (not shown) when the scale 1 is in a closed position.

Figure 3:
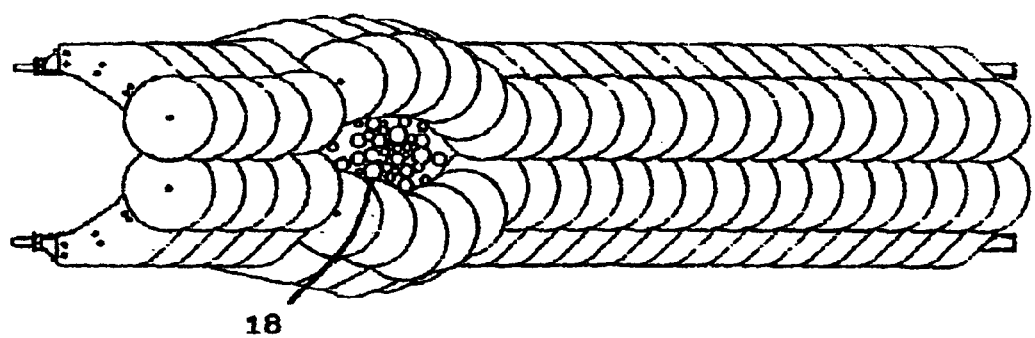
FIG. 3 is a view of the scales attached to rails as they would look when in contact with the stalks of a blueberry bush.

27 scales 1 are attached to a rail 15 in rows on each side of the picking machine using the pivots 4 at intervals of 4.5 inches as shown in FIG. 3 separated from the machine. In contrast, existing scales in commercial harvesting machines are 6 inches apart and number 22 in a row. The two rows of the scales 1 would cover the space in the lower part of the center of the picking machine to catch the berries as they fall from bushes. The pivots 4 are positioned at a slight angle in bearings 16 in the rails 15 so the scales 1 overlap one another from front or leading edge 11 to back or trailing edge 12 as well as tilt upward at the disc end 7. While in a resting position the straight segment 10b of the trailing edge of the scale 1 is parallel to the rail 15 which is equipped with bearings 16, in one of which each scale 1 is attached in an overlapping arrangement as shown in FIG. 3.

Given the space inside existing commercial harvesting machines, 27 scales of the present invention combined with 4.5 inch spacing of the pivots on the rails would occupy the same space as 22 existing commercial scales spaced 6 inches apart.

The present scale rotates about 40 degrees around the pivot 4 when turning from a closed to an open position and again from an open position back to a closed position. The angle can acceptably vary from about 38 to about 42 degrees and is measured using a line drawn from the pivot to the point on the scale that is furthest from the pivot. That angle also represents the distance a scale 1 of the present invention rotates as it moves up to and rotates around each blueberry bush branch or cane 18. The movement is therefore closer to being perpendicular to the direction the machine is moving over the bushes than commercial scales presently being used which by actual comparable measurement rotate about 65 degrees. The movement and shape of the present scales combine to assure that there will be less open space around the irregularly sized and distributed stalks of a berry bush and therefore less waste when berries fall from the bush to the ground. This is more clearly illustrated by FIG. 3.

The rotating disc also does less damage to the bark of a cane (variously called a stalk or branch) and therefore reduces disease to the bush. The shape of the scales and the manner in which they move also fills the space around the canes as the machine moves along each row of bushes and therefore collects more berries and reduces the number that fall on the ground.

Since the distance the machine travels to rotate a scale of the present invention (14 inches) is less than that required to rotate scales being used commercially (22.5 inches) by actual measurement (using the distance traveled by the furthest point on the scales from the pivot), machines equipped with scales of the present invention are more efficient than existing machines.

The foregoing provides both a general description of the present invention as well as a specific description of a preferred embodiment. It should be understood that various substitutions, variations and modifications can be made by those skilled in the art without departing from the spirit and scope of the invention as further delineated in the following claims.

The invention claimed is:

1. A collecting scale for a berry harvesting machine, the scale comprising:

An arm having a top surface, a bottom surface, a first end and a second pointed end;

a circular disc mounted for free rotation to the top surface of the first end of the arm;

a plate, having a narrow end and an opposing wider end shaped to receive the circular disc, fixedly mounted to the top surface of the arm between the pointed end of the arm and the circular disc;

a pivot mounted on the bottom surface under the pointed end of the arm;

wherein the circular disc and the plate, when mounted to the arm, form a continuous flat, planar top surface of the scale; and wherein the bottom surface of the arm defines a bottom surface of the scale.

2. The collecting scale of claim 1, further comprising:

The circular disc having a diameter of about 11 to about 15 inches;

The scale tapering from the circular disc to the pointed end of the arm; and

Wherein the scale is adapted to rotate on a rail of the berry harvesting machine about the pivot from about 38 to about 42 degrees when going from a closed to an opened position.

3. A collecting scale assembly suitable for use as a replacement part for berry harvesting machines comprising a plurality of collecting scales arranged in an overlapping array on a rail of the machine, each scale comprising:

An arm having a top surface, a bottom surface, a first end and a second pointed end;

A circular disc mounted for free rotation to the top surface of the first end of the arm;

A plate, having a narrow end and an opposing wider end shaped to receive the circular disc, fixedly mounted to the top surface of the arm between the pointed end of the arm and the circular disc;

A pivot mounted on the bottom surface under the pointed end of the arm;

Wherein the circular disc and plate, when mounted to the arm, form a continuous flat, planar top surface of the scale; and Wherein the bottom surface of the arm defines a bottom surface of the scale.

4. The collecting scale assembly of claim 3, further comprising about 27 scales with the pivots spread about 4.5 inches apart when fit into bearings on the rail of the berry harvesting machine.

5. The collecting scale assembly of claim 4, further comprising:

the circular discs having a diameter of about 13 inches;

the plates having a concave leading edge and a convex trailing edge, both edges extending between the narrow end of the plate and the wider end of the plate for receiving the circular disc;

Wherein, from a top view, the scales taper from the circular disc to the pointed end of the arm; and Wherein the scales rotate about 40 degrees relative to the rail around the pivot when moving from a closed to an opened position.

* * * * *